United States Patent
Melnychuk et al.

(10) Patent No.: US 10,935,746 B2
(45) Date of Patent: Mar. 2, 2021

(54) LIQUID-FREE CONVEYANCE OF FIBER OPTIC CABLE

(71) Applicant: Precise Downhole Services Ltd., Nisku (CA)

(72) Inventors: Michael Melnychuk, Nisku (CA); Nathan Frederick, Nisku (CA)

(73) Assignee: Precise Downhole Services Ltd.

( * ) Notice: Subject to any disclaimer, the term of this patent is extended or adjusted under 35 U.S.C. 154(b) by 41 days.

(21) Appl. No.: 15/996,241

(22) Filed: Jun. 1, 2018

(65) Prior Publication Data

US 2018/0372980 A1    Dec. 27, 2018

Related U.S. Application Data

(60) Provisional application No. 62/513,893, filed on Jun. 1, 2017.

(51) Int. Cl.
   *G02B 6/44* (2006.01)
   *H02G 1/08* (2006.01)

(52) U.S. Cl.
   CPC ........ *G02B 6/4464* (2013.01); *G02B 6/447* (2013.01); *G02B 6/4465* (2013.01); *G02B 6/4459* (2013.01)

(58) Field of Classification Search
   CPC .... G02B 6/4465; G02B 6/447; G02B 6/4464; H02G 1/081; H02G 1/086; H02G 1/088
   See application file for complete search history.

(56) References Cited

U.S. PATENT DOCUMENTS

| 5,464,308 A | 11/1995 | Missout | |
| 5,499,797 A * | 3/1996 | Sano | G02B 6/4464 254/134.4 |
| 5,533,164 A * | 7/1996 | Preston | G02B 6/4438 385/100 |
| 7,225,533 B2 * | 6/2007 | Sylvia | G02B 6/4464 254/134.3 CL |
| 2010/0148138 A1 | 6/2010 | Baker et al. | |

FOREIGN PATENT DOCUMENTS

| CN | 104730671 A | 6/2015 |
| FI | 28487 A | 12/1956 |
| JP | S5729013 A | 2/1982 |
| KR | 100839462 B1 | 6/2008 |
| LU | 81062 A1 | 3/1979 |

* cited by examiner

*Primary Examiner* — Joseph J Hail
*Assistant Examiner* — J Stephen Taylor
(74) *Attorney, Agent, or Firm* — Bennett Jones LLP

(57) ABSTRACT

A method of conveying a fiber optic cable through a conduit having an inside diameter involves connecting an interior pig assembly to a far end of the fiber optic cable, the interior pig assembly having an outside diameter smaller than the conduit inside diameter, and inserting the interior pig assembly into the conduit. To convey the fiber optic cable through the conduit, the interior pig assembly may be magnetic, and an exterior assembly including a magnet outside the conduit may be used to pull the interior pig assembly pig through the conduit. In addition or alternatively, a gas may be injected into the conduit to push the pig assembly through the conduit.

10 Claims, 1 Drawing Sheet

LIQUID-FREE CONVEYANCE OF FIBER OPTIC CABLE

FIELD OF THE INVENTION

The present invention relates to the installation of a fiber optic cable.

BACKGROUND

Fiber optic sensors have been developed for monitoring oil and gas extraction processes. The sensors are linked with fiber optic cables to surface measurement instrumentation. Amongst other advantages, fiber optic cables and sensors may withstand extremes of high pressure and temperature. Furthermore, such fiber optic sensors may be of a structure and diameter similar to those of the fiber optic cable itself. There are specific advantages in being able to remove and replace a sensor for the purposes of calibration, repair, and enhancement, but this is difficult to do, as is well known in the oil and gas industry.

It is known to install fiber optic cable into a conduit using hydraulic fluid flow. Generally, the cable itself or a member on the cable provides impedance to fluid flow. Thus, hydraulic fluid flow in the conduit can be used to "drag" the cable into the conduit.

SUMMARY OF THE INVENTION

In one aspect, the invention may comprise a method of conveying a fiber optic cable through a conduit having an inside diameter, the method comprising the steps of:
(a) connecting an interior assembly comprising a magnetic section to a far end of the fiber optic cable;
(b) inserting the interior pig assembly into the conduit; and
(c) magnetically pulling the interior assembly through the conduit with an exterior assembly comprising a magnet.

In one embodiment, the magnetic section of the interior assembly is itself magnetized. In one embodiment, the interior assembly is an interior pig assembly, and the method comprises the further step of injecting a gas into the conduit to push the interior pig assembly through the conduit, simultaneously or subsequently to the step of pulling the interior pig assembly magnetically.

In another aspect, the invention comprises a method of conveying a fiber optic cable through a conduit having an inside diameter, the method comprising the steps of:
(a) connecting an interior pig assembly to a far end of the fiber optic cable, and inserting the interior pig assembly into the conduit; and
(b) injecting a gas into the conduit to push the interior pig assembly through the conduit.

In one embodiment, wherein the method further comprises the steps of:
(c) before connecting the interior pig assembly to the far end of the fiber optic cable, inserting the fiber optic cable through a mechanical pack off assembly comprising a section of tubing having an inside diameter that allows passage of the fiber optic cable, while restricting backflow of the gas; and
(d) after inserting the interior pig assembly into the conduit, but before injecting the gas into the conduit to push the interior pig assembly through the conduit, joining the mechanical pack off assembly and the conduit together with a compression fitting.

In another aspect, the invention may comprise an interior assembly configured to fit within a conduit, for installing a fiber optic cable into the conduit, comprising:
(a) a magnetic section; and
(b) a transition section adapted to attach to an end of a fiber optic cable.

In one embodiment, the interior assembly is a pig assembly wherein the transition section comprises at least one pigging bead having an outside diameter fitting closely within an inside diameter of the conduit.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF PREFERRED EMBODIMENTS

Figure 1:
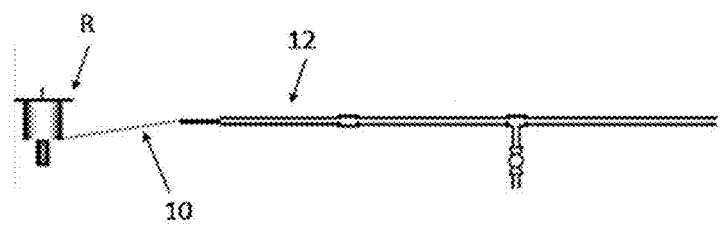
FIG. 1 shows a side cross-section view of a fiber optic cable being conveyed into a conduit in accordance with an embodiment of the method of the present invention.

In one embodiment, the invention comprises a method of conveying a fiber optic cable into a conduit. Referring to FIG. 1, the fiber optic cable (10) is deployed on a reel (R) and is conveyed into a conduit (12) which has one end in a stuffing box (not shown). A typical conduit (12) may have an outside diameter of 0.250" with 0.049" wall thickness and a length which may exceed several hundreds of meters, although other configurations of conduit (12) are commonplace.

The far end of the fiber optic cable (10) is attached to an interior assembly (13), comprising a magnetic section (14) and a transition section (16) which is attached to the fiber optic cable (10) and the magnetic section (14). In one embodiment, the transition section (16) comprises a sleeve which fits around the end of the fiber optic cable (10) and the magnetic section. A protective material, which preferably is an adhesive such as an epoxy, may be inserted into the sleeve to provide strength to the attachment. The magnetic section (14) may comprise a plurality of magnetic beads, such as steel beads, strung on a short length of cable. The steel beads may themselves be magnetized. The steel beads may be separated longitudinally by spacers (15), which may be non-magnetic, smaller beads. As used herein, the term "bead" means an element which may be spherical, oval, conical, cylindrical or any other suitable shape which fits within the conduit.

The transition section (16) may also comprise a plurality of enlarged diameter pigging beads strung on a cable, to provide pigging capability to the assembly, as described below. Such an interior assembly is referred to herein as an interior pig assembly. These beads are preferably comprised of a low-friction material, such as polytetrafluoroethylene (Teflon™). In one embodiment, the transition section may be several inches to several feet in length, for example, from 6 inches to 6 feet. There may be as few as one, and as many as dozens of beads.

The size, weight and space-out of the interior pig assembly (13) may be configured specific to the particular conduit

(12) into which the assembly (13) is being installed. The assembly (13) should move relatively freely within the conduit (12), but without excess clearance to allow for gas assist injection as described below.

In use, the fiber optic cable (10) is inserted into a mechanical pack off assembly (5) and fed through the pack off assembly. The pack off assembly (5) may be comprised of a single mechanical seal or a length of tubing (6) having a restricted inside diameter (ID) to provide resistance against backflow, which ID may be about 150 microns. As such, the pack off assembly will allow passage of the fiber optic while restricting or impeding backflow of fluids. The size of the pack off may be adjusted depending on the fiber optics outside diameter (OD).

After the fiber optic cable (10) is fed through the mechanical pack off, the end of the fiber optic cable (10) may be attached to the interior pig assembly (13). The interior pig assembly (13) may then be introduced to the conduit (12).

Figure 2:
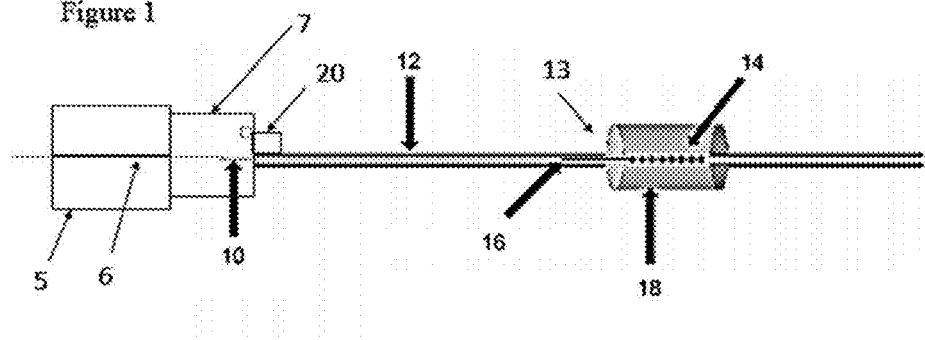
FIG. 2 shows an interior pig assembly within a conduit, and an exterior assembly magnet holder.

The conduit (12) and pack off assembly (5) are joined together with a compression fitting (7). The conduit (12) is positioned substantially straight and the external exterior assembly (18) is aligned with the magnetic section (14) of the internal interior pig assembly (13), as shown in FIG. 2.

The exterior assembly (18) holds at least one magnet, preferably a plurality of strong magnets, or is comprised of ferromagnetic material. The assembly (18) has an internal bore through which the conduit (12) may pass as the exterior assembly slides along the conduit (12). The exterior assembly (18) may then be used as a pull device as it is moved along the exterior of the conduit (12), pulling the fiber optic cable (10) to the desired location.

A gas may be utilized to assist in pulling the interior pigging assembly (13) within the conduit. Pressurized gas, such as air or nitrogen may be introduced into the conduit (12) above the interior pig assembly (13). As the interior pig assembly (13) provides an impedance to gas flow, the gas flow will push the interior assembly (13) down the conduit (12). The gas injection point (20) may be provided at any suitable point, such as the transition from mechanical pack off to conduit (12). The gas assist may done without the use of any liquid.

In some embodiments, a combination of the exterior assembly (18) and injected gas is used to convey the fiber optic cable (10) through the conduit (12), at the same time or in stages. For example, the exterior assembly may be used to position the fiber optic cable (10) in an initial section of the conduit, followed by gas injection to install the cable (10) into the remaining section of the conduit.

Definitions and Interpretation

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A method of conveying a fiber optic cable through a conduit having an inside diameter, the method comprising the steps of:
    (a) connecting an interior assembly comprising a magnetic section comprising a plurality of magnetic beads to only a far end of the fiber optic cable;
    (b) inserting the interior assembly into the conduit;
    (c) magnetically pulling the interior assembly through the conduit with an exterior assembly comprising a magnet;
    (d) wherein the interior assembly is an interior pig assembly, and further comprising the step of injecting a gas into the conduit to push the interior pig assembly through the conduit, simultaneously or subsequently to the step of pulling the interior pig assembly magnetically.

2. The method of claim 1, wherein the magnetic section of the interior assembly is magnetized.

3. The method of claim 1, wherein the plurality of magnetic beads comprises a plurality of steel beads.

4. The method of claim 3, wherein the plurality of steel beads are separated by spacers interspersed with the plurality of steel beads.

5. The method of claim 1, wherein the exterior assembly comprises a cylinder having an inner bore through which the conduit slides, and bearing or comprising a plurality of magnets.

6. The method of claim 1, wherein the gas is nitrogen.

7. A method of conveying a fiber optic cable through a conduit having an inside diameter, the method comprising the steps of:

(a) connecting an interior pig assembly comprising a plurality of beads to only a far end of the fiber optic cable, and inserting the interior pig assembly into the conduit; and (b) injecting a gas into the conduit to push the interior pig assembly through the conduit.

8. The method of claim 7 wherein the gas is nitrogen.

9. The method of claim 7, wherein the method further comprises the steps of: (a) before connecting the interior pig assembly to the far end of the fiber optic cable, inserting the fiber optic cable through a mechanical pack off assembly comprising a section of tubing having an inside diameter that allows passage of the fiber optic cable, while restricting backflow of the gas; and (b) after inserting the interior pig assembly into the conduit, but before injecting the gas into the conduit to push the interior pig assembly through the conduit, joining the mechanical pack off assembly and the conduit together with a compression fitting.

10. The method of claim 9, wherein injecting the gas into the conduit to push the interior pig assembly through the conduit comprises injecting the gas at a transition from the mechanical pack off to the conduit.

\* \* \* \* \*